US00RE41637E

(19) United States
(12) Reissued Patent
O'Hara et al.

(10) Patent Number: US RE41,637 E
(45) Date of Reissued Patent: Sep. 7, 2010

(54) STYLUS VISUAL INDICATOR SYSTEM

(75) Inventors: Sean O'Hara, Foster City, CA (US); Brian Torrey, San Mateo, CA (US); Patricia E. Torrey, San Mateo, CA (US)

(73) Assignee: Palm, Inc., Sunnyvale, CA (US)

(21) Appl. No.: 11/229,451

(22) Filed: Sep. 16, 2005

Related U.S. Patent Documents

Reissue of:
(64) Patent No.: 6,621,697
Issued: Sep. 16, 2003
Appl. No.: 09/865,012
Filed: May 24, 2001

(51) Int. Cl.
*H05K 7/20* (2006.01)
*G05F 1/16* (2006.01)
H01L 23/36

(52) U.S. Cl. ..... 361/679.4; 361/679.01; 361/679.1; 361/679.02; 361/679.3; 345/179; 385/133

(58) Field of Classification Search ..... 361/683, 361/686, 687, 689, 751, 758, 759; 385/53, 385/88, 92, 133, 147; 340/815.2, 653, 815.45, 340/7.1, 7.32, 7.4, 7.63; 345/180, 182, 183, 345/150, 156–179; 320/114, 115, 116
See application file for complete search history.

(56) References Cited

U.S. PATENT DOCUMENTS 5,088,056 A 2/1992 McIntosh et al.
5,210,532 A 5/1993 Knoedler et al.
5,528,285 A * 6/1996 Morikawa et al. ..... 348/14.01
5,546,078 A 8/1996 Motohashi et al.
5,570,025 A 10/1996 Lauritsen et al.
5,675,524 A * 10/1997 Bernard ..... 708/109
5,760,690 A 6/1998 French
5,796,575 A 8/1998 Podwalny et al.
5,861,815 A 1/1999 Wernig
5,877,695 A 3/1999 Kubes et al.
5,959,616 A * 9/1999 Challener ..... 345/179
5,973,612 A 10/1999 Deo et al.
6,046,733 A * 4/2000 Challener et al. ..... 345/179
6,144,363 A 11/2000 Alloul et al.
6,154,200 A * 11/2000 Challener et al.
6,209,011 B1 * 3/2001 Vong et al.
6,246,577 B1 * 6/2001 Han et al.
6,268,789 B1 7/2001 Diamant et al.
6,310,634 B1 10/2001 Bodnar et al.
6,374,102 B1 * 4/2002 Brachman et al. ..... 455/422.1
6,438,215 B1 * 8/2002 Skladman et al. ..... 379/67.1
6,456,204 B1 * 9/2002 Riley et al. ..... 340/815.45
6,473,552 B1 * 10/2002 Fisher et al. ..... 385/133
6,477,043 B2 * 11/2002 McKnight ..... 361/685
6,498,835 B1 * 12/2002 Skladman et al. ..... 379/88.12
6,696,922 B1 * 2/2004 Wong et al. ..... 340/7.32
6,792,263 B1 * 9/2004 Kite ..... 455/412.1
6,831,568 B1 12/2004 Cortopassi et al.
7,119,706 B1 10/2006 Cortopassi et al.
7,123,905 B1 * 10/2006 Allaway et al. ..... 455/417
7,349,361 B1 * 3/2008 Allaway et al. ..... 370/316
2002/0032020 A1 * 3/2002 Brown et al. ..... 455/414

OTHER PUBLICATIONS

Preliminary Amendment and Remarks for Application Serial No. 11/544,280, filed Oct. 9, 2007, pp. 1–7.
Board of Patent Appeals and Interferences, Decision on Appeal, *Ex parte* Sherridythe A. Fraser, Shawn R Gettemy, Kevin Lee, Yoon Kean Wong, and Lawrence Lam, Appeal 2007–0251, Application 10/085,310, Technology Center 2600, Decided Mar. 12, 2007.

* cited by examiner

*Primary Examiner*—Michael V Datskovskiy
(74) *Attorney, Agent, or Firm*—Foley & Lardner LLP

(57) ABSTRACT

A handheld computer system includes a housing, a processor coupled to the housing, a stylus coupled to the housing, and a light source coupled to the housing. The light source lights up the stylus.

40 Claims, 2 Drawing Sheets

STYLUS VISUAL INDICATOR SYSTEM

Matter enclosed in heavy brackets [ ] appears in the original patent but forms no part of this reissue specification; matter printed in italics indicates the additions made by reissue.

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as communications network connectivity, internet connectivity, voice memo recording, and telephony functions. Because of the small size and portability of handhelds, strict adherence to hardware constraints, such as input hardware must be maintained. It is conventional to have buttons or switches on the handheld computer for providing user input to the handheld computer.

Handheld computing devices may include a wireless telephony device permitting the user to make wireless communications such a mobile telephone calls or data downloads or uploads to a computer network. It is conventional to employ a touch pad, touch screen, or handwriting recognition area and/or device to provide input to the handheld computer.

Handheld computing devices may also include a stylus used to input data via a touch screen or handwriting recognition area of the computing device. Conventionally, the stylus is used as a mechanical pointer device, and is constructed of plastic. Other than serving as a mechanical input device, the conventional stylus is not used for other functions relating to the handheld computer.

Handheld computing devices typically communicate information to the user via the display and through audio signals. For example, in order to notify the user that an appointment is upcoming, the handheld computing device may emit an audible signal as well as show the particular appointment on the display.

There are several disadvantages associated with conventional methods of indicating information to the user of a handheld computing device. The use of audible signals may be inappropriate at certain times such as when the user is in a meeting, or when the user is asleep. Further, audible signals are difficult to differentiate from one another in order to make distinctions between the type of information the handheld computer is attempting to convey. Audible signals are also disadvantageous because the user may be in a noisy environment such as a manufacturing plant or a sporting event where the use is unable to hear the audible signal.

Using visual indication on the display of the handheld computer also presents difficulties if the user is not situated proximate the device, and therefore cannot read what is on the screen, or in situations where the user is too busy to handle the device and interact with the display to determine the information that the handheld computer is attempting to convey, for example when the user is driving.

Another way portable electronic devices convey timely information to the user is by vibrating, such as when a pager vibrates upon the receipt of an incoming page or e-mail message. The use of a vibrating mechanism presents difficulties in that the user cannot differentiate between the type of information the handheld computer is attempting to convey, and further, the user may not be in contact with the device and able to know that the device is vibrating.

If the user is unable to differentiate between the types of information that the handheld computer is attempting to convey via audible or vibrating signals, the user must then activate the device and open an application from a menu to determine the content of the message. These actions take time, reducing the overall efficiency of the device.

Another problem presented by conventional handheld computer devices is that the type of signals conveyed to the user may not be user programmable such that the user can differentiate between the types of messages being conveyed by the handheld computing device. For example, the user may wish to have different signals when an appointment is upcoming versus when the device has received an e-mail. There are many different types of information that may be conveyed with different signals to the user, such as battery charge levels, levels of urgency of alarms, receipt of e-mails, receipt of wireless telephone calls, and notification of upcoming appointments categorized by importance.

Further, the small size of the typical handheld computing device presents problems in situating an indicator, particularly a visual indicator, on the device itself.

Accordingly, there is a need for a handheld computing device that includes a visual indicator designed to communicate various types of information to the user, wherein the indicator is user programmable, permits easy differentiation of the type of information being displayed, is effective regardless of whether the user is holding the device, and does not take up space on the handheld computer requiring a larger size computer to accommodate the visual indicator.

The teachings hereinbelow extend to those embodiments that fall within the scope of the appended claims, regardless of whether they accomplish one or more of the above identified needs.

SUMMARY

An exemplary embodiment relates to a handheld computer system. The handheld computer system includes a housing, a processor coupled to the housing, a stylus coupled to the housing, and a light source coupled to the housing. The light source lights up the stylus.

Another exemplary embodiment relates to a handheld computer system. The handheld computer system includes a handheld computer having a processor, a cradle configured to receive the handheld computer, a stylus configured to be electrically coupled to the cradle, and a light source disposed with the cradle. The light source lights up the stylus.

Yet another exemplary embodiment relates to a handheld computer system having a housing, a processor coupled to the housing, a stylus coupled to the housing, and a light source disposed within the stylus. A power source is disposed within the housing in electrical contact with the stylus.

Still another exemplary embodiment relates to a visual indicator system for a handheld computer. The visual indicator includes a stylus, a stylus dock configured to receive this stylus, a light source disposed within one of the stylus and the stylus dock, and a controller. The controller varies the light source wherein the stylus conveys a visual message to a user via the light source.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
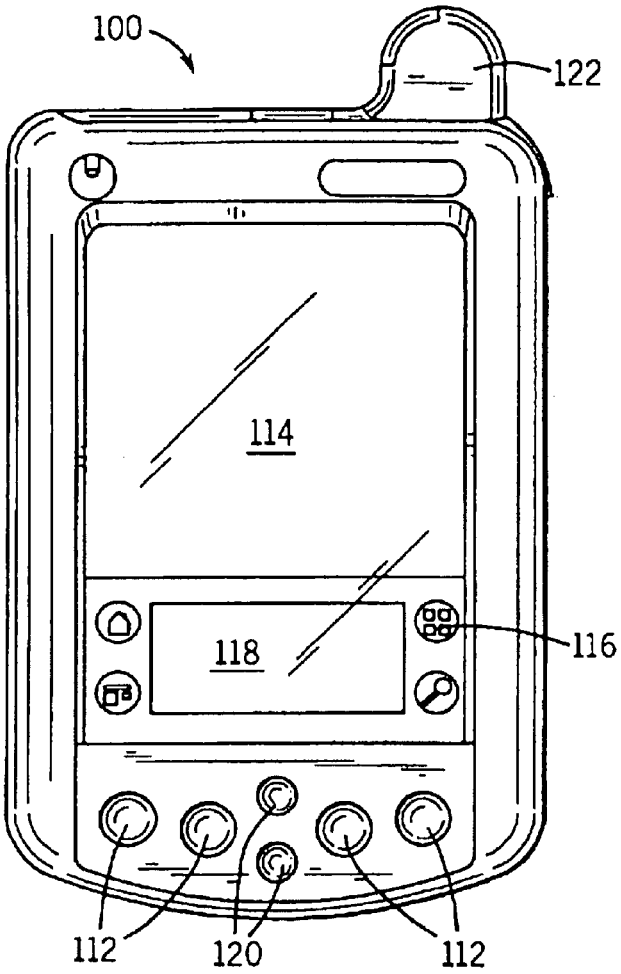
FIG. 1 is an exemplary front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, and other portable electronic devices.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity and wireless telephony.

Handheld computer 100 includes a plurality of input function keys 112 and a display 114 having graphical user interface features. In an exemplary embodiment, display 114 also includes a Graffiti™ (or other handwriting recognition software) writing section 118 for tracing alpha-numeric characters as input. A plurality of input icons 116 for performing automated or preprogrammed functions maybe be provided on a portion of display 114.

Handheld computer 100 also includes navigation buttons 120 that may be utilized for navigating or scrolling of information displayed on display 114. Further, navigation buttons 120 may be programmed for other uses depending on the application running on handheld computer 100.

Handheld computer 100 may also include an integrated antenna 122 configured to transmit and receive wireless communication signals, such as, but not limited to, cellular telephone communication signals and other radio frequency (RF) communications signals.

Figure 2:
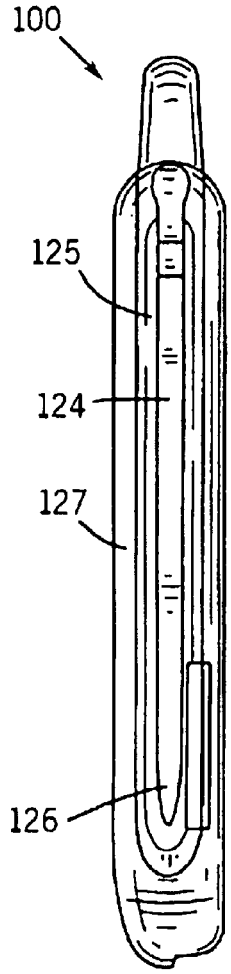
FIG. 2 is an exemplary side view of a handheld computer.

Referring to FIG. 2, an input device, shown as, but not limited to, a stylus 124 may be used to interact with display 114. Display 114 may be provided with a touch screen interface that allows a user to select and alter displayed content using stylus 124.

Stylus 124 may be coupled along a side of handheld computer 120 as shown in FIG. 2. To use stylus 124, a user may remove stylus 124 from a slot 125 formed in housing 127. Slot 125 operates as a point of storage for stylus 124. To provide the functionality required for an effective interface with display 114, stylus 124 typically has a pointed tip 126.

Figure 3:
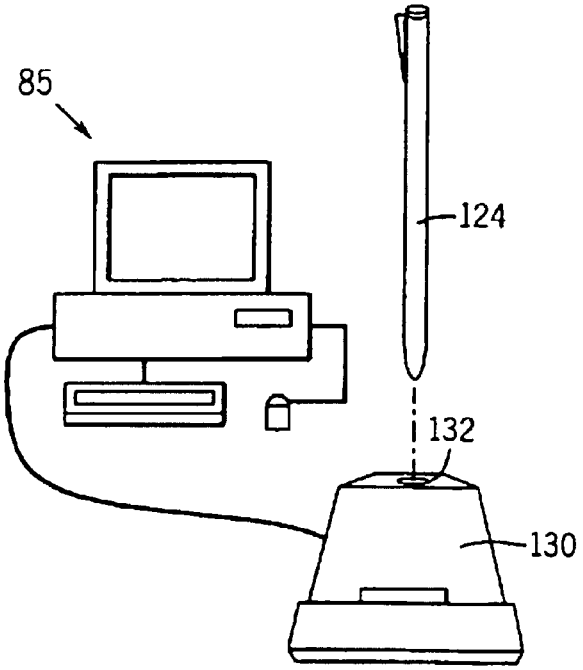
FIG. 3 is a perspective view of a stylus and a handheld computer cradle.

Referring to FIG. 3, a cradle 130 may also be configured to couple with stylus 124. A stylus dock, shown as, but not limited to recess 132 receives stylus 124. Cradle 130 is typically configured to receive handheld computer 100 and is further coupled to a personal computer and possibly a power source to supply power and data to handheld computer 100.

In an exemplary embodiment, stylus 124 may be constructed such that it transmits and emits light. For example, the use of a translucent plastic material can convert stylus 124 into a light pipe that emits light from all sides when a light source is applied to one portion of stylus 124 or is disposed within stylus 124. Depending on the use of and particular placement of reflective material within stylus 124, stylus 124 may be designed to emit more or less light from the side walls, and/or the end distal from the light source to create the desired effect.

Figure 4:
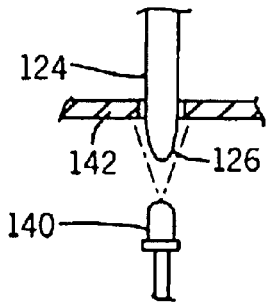
FIG. 4 is a detailed view of a stylus and a light source.

Referring to FIG. 4, stylus 124 can be lighted through the use of a light source, shown as, but not limited to, light-emitting diode (LED) 140. In the exemplary embodiment depicted in FIG. 4, tip 126 of stylus 124 extends through a housing 142, and is disposed adjacent LED 140. Housing 142 can be part of cradle 130, or a part of handheld computer 100, for example LED 140 may be disposed within slot 125. The light emitted from LED 140 enters tip 126 and is transmitted through stylus 124 such that stylus 124 becomes a visual indicator, emitting the light transmitted by LED 140.

Figure 5:
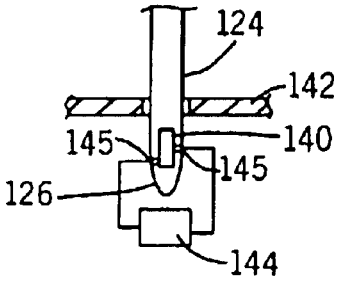
FIG. 5 is a detailed view of a stylus having an integrated light source.
Figure 6:
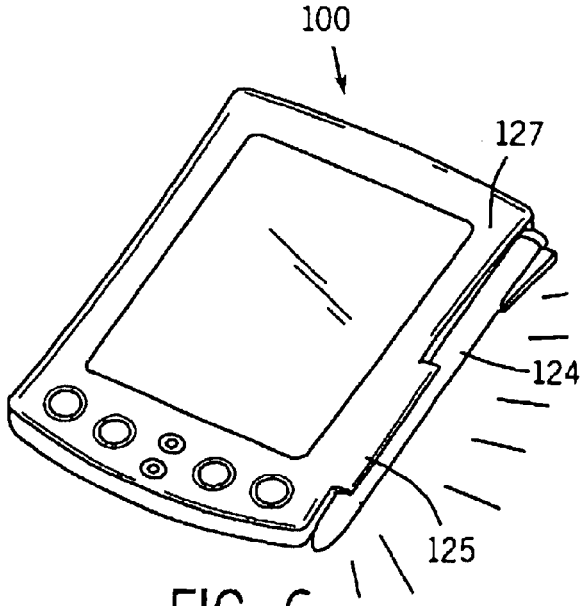
FIG. 6 is a perspective view of a handheld computer.

Referring to FIG. 5, in another exemplary embodiment, LED 140 may be disposed within stylus 124. Because power is required to light LED 140, an external power source may be disposed beneath housing 142 to couple with and provide power to stylus 124 through contact 145 on tip 126 when stylus 124 is disposed in recess 132 of cradle 130 or in slot 125 of handheld computer 100. As depicted in FIG. 6, when a message is being communicated to a user of handheld computer 100 having a stylus 124 stored in slot 125, a signal is activated to provide power to activate a light source, such as LED 140, which lights up stylus 124. Such lighted stylus may be seen as light emanating from the side of housing 127.

The use of LED 140 in combination with stylus 124 permits many alternative types of visual indicators. Multiple colors may be displayed from a single LED or multiple LEDs 140, LED 140 may be modulated to blink in a variety of sequences, the intensity of LED 140 may be varied, and multiple LEDs can be disposed within stylus 124 at differing locations to create visual patterns utilizing different colors, intensities, and/or sequencing of LEDs 140. The multitude of differing visual indicators utilizing single or multiple LEDs 140 in conjunction with the structure of stylus 124 permits the user to identify the type of information being conveyed by handheld computer 100.

Because handheld computer 100 is used for such a wide range of functions, a visual indicator system using stylus 124 may be used to transmit many types of relevant information. For example, a certain pattern may be used to indicate an upcoming appointment in the calendar, and may be changed depending on the time remaining before the appointment. Lighted stylus 124 may also be used to indicate when an e-mail has been received via a wireless communication, and a different indicator may be used to inform the user that an instant message, or cellular telephone call has been received. Further visual indicators using different patterns, intensity, or colors could include notification of battery state, the reception of other wireless information such as a business card transmitted from another handheld computer 100, or other hardware indications, such as the transmission of a wireless communication from handheld computer 100.

Because handheld computer 100 is a computing device, the user may be permitted to individually program the handheld computer 100 to emit a differing visual display based upon user defined parameters.

The data used to determine the visual display emitted by stylus 124 may be housed on handheld computer 100, or on a personal computer 85 coupled to cradle 130. The processor on board handheld computer 100, personal computer 85, or possibly cradle 130 may be used to determine the particular visual pattern and timing of the various visual displays utilizing stylus 124.

Handheld computer 100 having light up stylus 124 addresses the shortcomings of conventional handheld computers without such a visual indicator. The ability to display multiple types of information using multiple LEDs 140 having various colors that can be blended, placed in different locations, oscillated on and off, and varied in indensity both allows the display of more information to the user as well as eliminating the necessity of using audible signals emitted from handheld computer 100. Because stylus 124 is typically several inches long, the visual indicator is large enough indicate information to the user even when placed at distances several feet away from the user. Further, the visual display of stylus 124 may be user programmable utilizing the operating system of handheld computer 100. Further, as discussed above, the face of handheld computer 100 includes display 114, input function keys 112, navigation buttons 120, as well as input icons 116 and writing section 118. The use of stylus 124 as a visual indicator precludes the need to expand the size of handheld computer 100 to include an additional visual indicator because stylus 124 is present on handheld computer 100 as originally designed, and the added functionality of the lighting display does not require the use of additional real estate on handheld computer 100.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A handheld computer system, comprising:

a housing;

a processor coupled to the housing;

a stylus;

a cradle configured to selectively connect with the housing and further configured to receive the housing;

a light source provided in the cradle, wherein the light source lights up the stylus;

wherein the light source is selectively activated by the processor.

2. The handheld computer system of claim 1, wherein the stylus is translucent.

3. The handheld computer system of claim 1, wherein the light source is an LED.

4. The handheld computer system of claim 3, wherein the LED is configured to emit more than one color.

5. The handheld computer system of claim 1, wherein the stylus has a tip extending into the housing.

6. A handheld computer system, comprising:

a handheld computer having a processor;

a cradle configured to receive the handheld computer;

a stylus configured to be electrically coupled to the cradle; and a light source disposed within the cradle, wherein the light source lights up the stylus.

7. The handheld computer system of claim 6, wherein the stylus is translucent.

8. The handheld computer system of claim 6, wherein the light source is an LED.

9. The handheld computer system of claim 8, wherein the LED is configured to emit more than one color.

10. The handheld computer system of claim 6, wherein the light source comprises a plurality of LEDs.

11. The handheld computer system of claim 6, wherein the light source is controlled by the processor.

12. A handheld computer system, comprising:

a housing;

a processor coupled to the housing;

a stylus coupled to the housing;

a plurality of LEDs disposed within the stylus, distributed throughout the length of the stylus; and a power source disposed within the housing in electrical contact with the stylus.

13. The handheld computer system of claim 12, wherein the stylus has a tip with contacts configured to be coupled to the power source.

14. The handheld computer system of claim 12, wherein the housing is part of a handheld computer.

15. The handheld computer system of claim 12, wherein the housing is part of a cradle.

16. The handheld computer system of claim 12, wherein at least one of the plurality of LEDs is configured to emit more than one color.

17. The handheld computer system of claim 12, wherein at least one of the plurality of LEDs is disposed within the tip of the stylus.

18. The handheld computer system of claim 12, wherein the light source comprises a plurality of LEDs.

19. The handheld computer system of claim 12, wherein the light source is controlled by the processor.

20. A visual indicator system for a handheld computer, comprising:

a stylus;

a stylus dock configured to receive the stylus;

a light source disposed within the stylus;

a controller, wherein the controller varies the light source; and a power source disposed within the stylus dock and coupled to the light source;

wherein the stylus conveys a visual message to a user via the light source.

21. The visual indicator system of claim 20, wherein the light source is an LED.

22. The visual indicator system of claim 21, wherein the LED is configured to emit more than one color.

23. The visual indicator system of claim 21, wherein the controller varies the color of the LED.

24. The visual indicator system of claim 21, wherein the controller varies the intensity of the LED.

25. The visual indicator system of claim 20, wherein the light source comprises a plurality of LEDs.

26. The visual indicator system of claim 20, wherein the stylus dock is in a synchronization cradle.

27. The visual indicator system of claim 20, wherein the stylus dock is in the handheld computer.

28. The visual indicator system of claim 20, further comprising a personal computer, wherein the controller is part of the personal computer.

29. The visual indicator system of claim 20, wherein the controller is part of the handheld computer.

30. The handheld computer system of claim 1, wherein a first type of activation of the light source conveys a first message to a user, and wherein a second type of activation of the light source light conveys a second message to the user.

31. The handheld computer system of claim 1, wherein activation of the light source conveys an indicator relating to at least one of a communication event, a calendar event, an appointment event, time remaining before an appointment, an e-mail event, an instant message event, a telephone call event, a battery indicator, and a receipt of information via wireless transmission.

32. A visual indicator system for a handheld computer, comprising:

a stylus;

a synchronization cradle;

a stylus dock provided in the synchronization cradle configured to receive the stylus;

a light source disposed within the stylus dock;

a controller, wherein the controller varies the light source; and wherein the stylus conveys a visual message to a user via the light source.

*33. A mobile computing device system, comprising:*

*a mobile computing device configured to provide wireless telephony and to provide wireless internet connectivity; and*

*a mobile electronic device capable of being separate from and configured to communicate with the mobile computing device, wherein a light source disposed within the electronic device selectively emits light in response to an application executed by the mobile computing device, wherein the electronic device is an input device configured to at least mechanically communicate with the mobile computing device.*

*34. The mobile computing device system of claim 33, wherein a processor is disposed within the electronic device.*

*35. The mobile computing device system of claim 33, wherein the light source is configured to convey a message by emitting a color of light.*

*36. The mobile computing device system of claim 33, wherein the light source is configured to convey a message by emitting an intensity of light.*

*37. The mobile computing device system of claim 33, wherein the light source is configured to convey a message by emitting a sequence of blinking light.*

*38. The mobile computing device system of claim 33, wherein the processor is configured to vary at least one of a color, an intensity, and a blinking sequence of light emitted from the light source.*

*39. The mobile computing device system of claim 33, wherein a visual message indicates at least one of a communication event, a calendar event, an appointment event, time remaining before an appointment, an e-mail event, an instant message event, a telephone call event, a battery status, and a receipt of information via wireless transmission.*

*40. The mobile computing device system of claim 33, wherein the mobile computing device comprises a touch screen to receive input to the mobile computing device.*

* * * * *

UNITED STATES PATENT AND TRADEMARK OFFICE

CERTIFICATE OF CORRECTION

PATENT NO. : RE41,637 E
APPLICATION NO. : 11/229451
DATED : September 7, 2010
INVENTOR(S) : Sean O'Hara, Brian Torrey and Patricia E. Torrey It is certified that error appears in the above-identified patent and that said Letters Patent is hereby corrected as shown below:

Column 5, claim 1, line 45: delete "housing" and insert --stylus-- after the words "receive the"

Signed and Sealed this
Twenty-fifth Day of January, 2011

David J. Kappos

David J. Kappos
*Director of the United States Patent and Trademark Office*